March 17, 1953  C. C. McCAIN  2,631,714

ROTARY HOPPER FOR ORIENTING TRANSMITTER CAPS

Filed July 21, 1951  2 SHEETS—SHEET 1

INVENTOR:
C. C. McCAIN

BY E. F. Kane

ATTORNEY

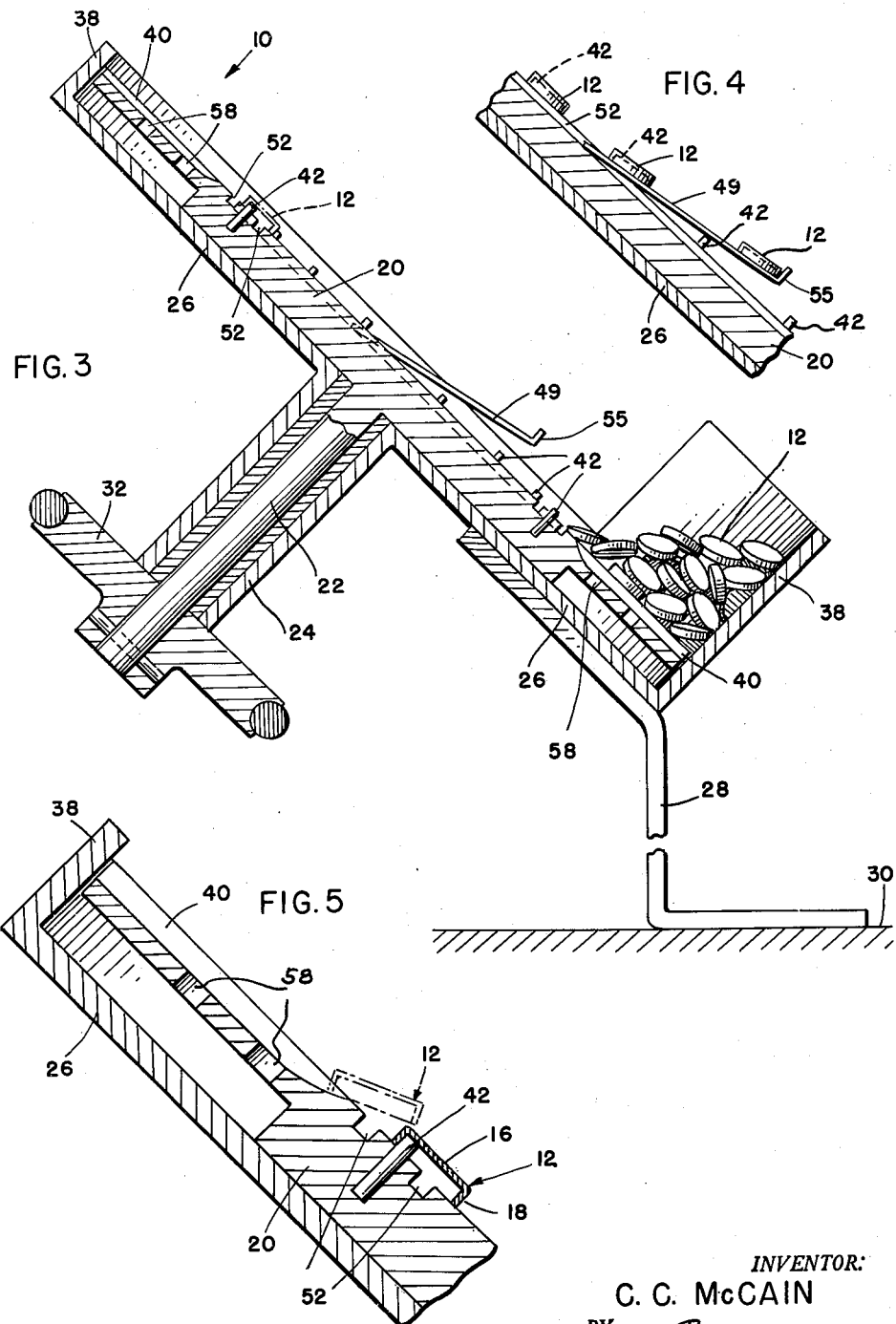

Patented Mar. 17, 1953

2,631,714

UNITED STATES PATENT OFFICE 2,631,714

ROTARY HOPPER FOR ORIENTING TRANSMITTER CAPS

Cecil C. McCain, Glen Ellyn, Ill., assignor to Western Electric Company, Incorporated, New York, N. Y., a corporation of New York Application July 21, 1951, Serial No. 237,943

8 Claims. (Cl. 198—30)

This invention relates to a device for orienting caps and more particularly to a device for receiving quantities of haphazardly positioned cup-shaped caps and re-arranging and discharging them in predetermined uniform relation to each other.

It is an object of the present invention to provide an efficient and effective device of simple construction for receiving a supply of haphazardly positioned cup-shaped caps and re-arranging and discharging them in a predetermined oriented relation to each other.

In accordance with one embodiment of the invention the device comprises a disk mounted for rotation about an oblique axis and a stationary wall encircling the disk and cooperating therewith to form a hopper for holding a supply of caps against the lower portion of the upper face of the disk. The disk is provided with radial grooves in the upper face thereof which extend inwardly from the periphery for receiving caps therein and for moving the caps upwardly as the disk rotates and which guide the caps as they slide down said grooves and cause them to be deflected by the curved end surface thereof over the ends of pins in the disk positioned adjacent the ends of the grooves so that the pins will engage the flanges of the cap and retain the cap thereon if the caps are positioned with the flanges thereof extending downwardly and will carry the caps into engagement with inclined fingers which cam the caps off of the pins and guide them into a guide chute in edge-to-edge relation relative to each other. A plurality of apertures disposed in a predetermined arrangement in the disk and in the grooves thereof pass successively past a nozzle for directing air through the apertures to dislodge all of the caps on successive portions of the disk moving upwardly past the nozzle except one cap in each groove.

Other objects and advantages of the invention will become apparent by reference to the following detailed description thereof when considered in conjunction with the accompanying drawings, illustrating the preferred embodiment thereof, in which Fig. 1 is a face view of the device;

Fig. 3 is a vertical central sectional view through the device taken on the line 3—3 of Fig. 1;

Fig. 4 is a developed vertical sectional view of a portion of the device taken on the line 4—4 of Fig. 1; and Fig. 5 is an enlarged fragmentary view of the upper portion of the device shown in Fig. 3.

Figure 1:
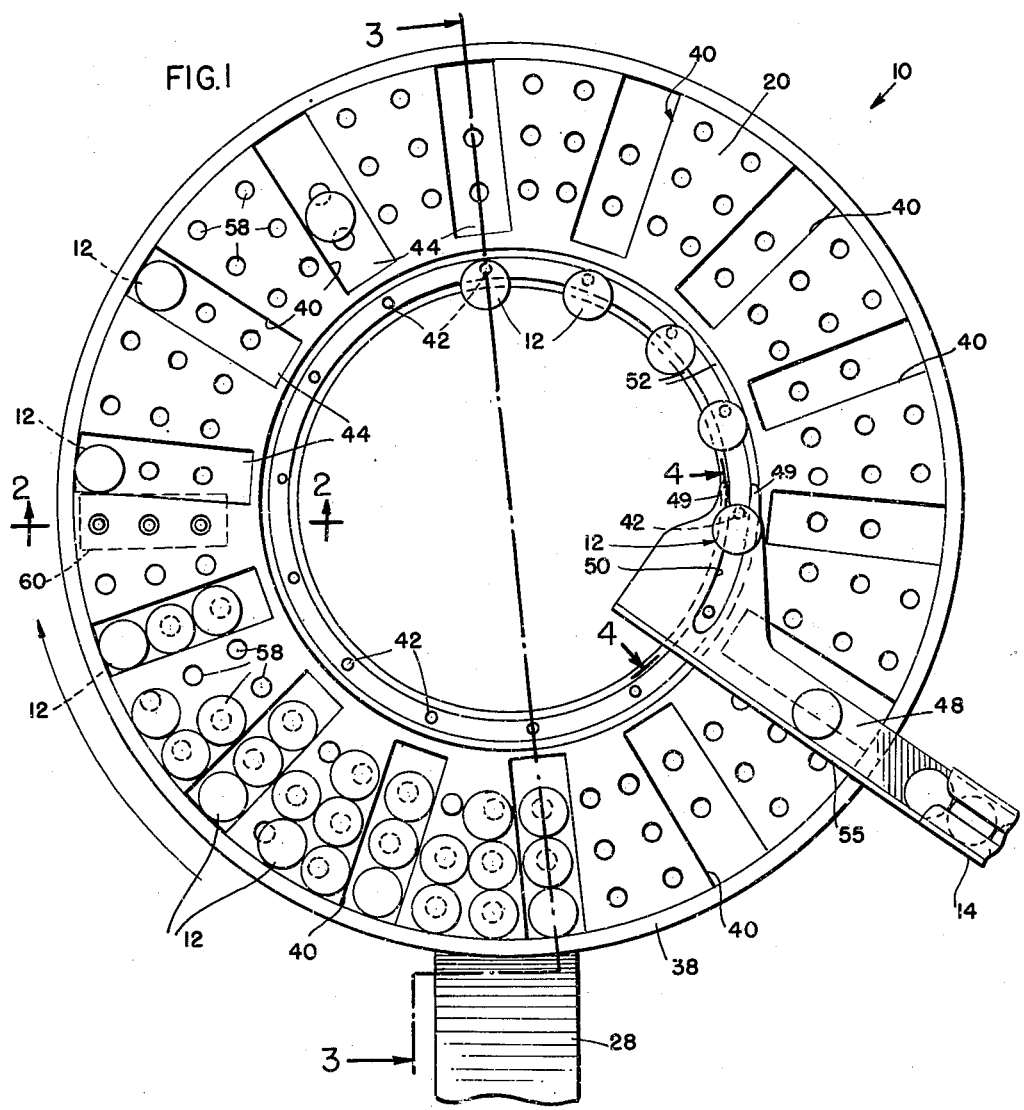

The present device 10 is designed to receive a supply of cup-shaped caps 12, sort or re-arrange the caps, and direct them from the device into a guide chute 14 in a predetermined oriented relation relative to each other. The caps 12 have a flat circular top 16 and a relatively short peripheral flange 18 extending transversely therefrom (Fig. 5).

The device 10 comprises a rotatable disk 20 fixed to a shaft 22 which is rotatably mounted in a bearing 24 formed on a circular plate 26 which in turn supports the disk 20 for rotation. A bracket 28 is fixed at one end to the plate 26 and is secured at its other end to a portion of a machine or other supporting member 30 to support the device at an angle and the disk 20 for rotation about an oblique axis. A pulley 32 fixed to the shaft 22 is connected by a belt 34 to any suitable drive for rotating the disk 20 at the desired speed.

A circular flange or wall 38 on the plate 26 encircles the disk 20 and cooperates therewith to form a hopper for receiving a supply of the caps 12 in the lower portion thereof. At its upper portion the length of the flange or wall 38 of the hopper is reduced as shown in Fig. 1.

Figure 2:
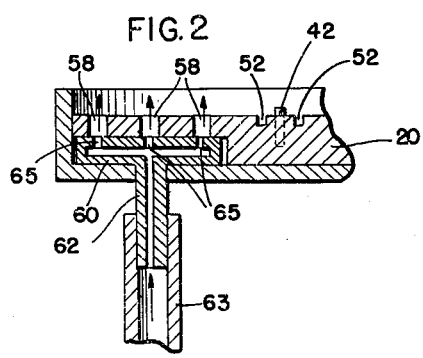
Fig. 2 is a detailed sectional view through the device taken on the line 2—2 of Fig. 1.

A plurality of shallow flat grooves 40 are formed in the upper surface of the disk 20 and extend radially inwardly for a predetermined distance from the outer periphery thereof in spaced relation to each other as indicated in Fig. 2. A plurality of pins 42 are mounted on the disk 20 in radial alignment with the grooves 40 and in spaced relation to the inner ends 44 of the grooves which ends 44 are curved or inclined upwardly to the upper surface of the disk. The grooves 40 at the lower portion of the inclined disk 20 engage the supply of caps and receive a plurality of the caps therein and carry them upwardly as the disk 20 rotates until the grooves approach the upper portion of the hopper and the inclination of the groove reaches a point where the caps therein will slide down and be guided by the inclined groove and return to the bottom of the hopper. The inclined end portion 44 of the groove will direct the caps 12 upwardly over and onto the ends of the pins 42 and if the caps are positioned in the grooves 40 with the flanges 18 extending downwardly the flanges will engage the pins 42 and the cap will be retained thereon. Those caps which are supported with their flanges directed upwardly as they are guided by the grooves 40 onto the ends of the pin 42 will not be retained thereon and will fall into the bottom of the hopper. Thus, all caps which are retained on the pins 42 are positioned on the disk 20 with their flanges extending in the same general direction downwardly from the tops 16 of the caps.

Any suitable mechanism may be provided for removing the caps 12 from the pins 42 and directing them into the guide chute 14. As shown herein the guide chute 14 has a wall or plate 48 which extends over the edge of the flange 38 of the hopper and has a pair of laterally extending fingers 49—49 forming a slot 50 therebetween. The fingers 49 of the chute are obliquely disposed to the face of the disk 20 and the ends thereof are reduced to fit into a pair of circular grooves 52—52 disposed on opposite sides of the pins 42. The ends of the fingers 49 riding in the grooves 52 engage the underneath edges of the caps 12 as the caps are carried by the pins 42 in a clockwise direction and cam the caps off the ends of the pins 42. The fingers 49 are disposed at a relatively steep angle to permit the free caps to slide downwardly on the fingers 49 into engagement with the wall 55 extending transversely from the wall 48. The walls 48 and 55 of the chute 14 are disposed at an angle to permit the caps to roll and slide downwardly and be directed in a predetermined path in the same predetermined oriented relationship to each other. The lower portion of the chute 14 may be enclosed with other walls to retain the caps 12 therein while they are advanced therein through a predetermined path.

In order to facilitate the operation of the device means are provided at a predetermined point for removing all of the caps from successive portions of the disk as it rotates except one cap in each of the grooves 40. A plurality of apertures 58 arranged in circular and radial rows are formed in the outer portion of the disk 20 through which air is directed at a predetermined point as the disk rotates to dislodge the caps from successive portions of the upper surface of the disk and permit them to fall to the bottom of the hopper. There are three apertures 58 in each radial row of apertures between the grooves 40 and two apertures in each of the grooves. The two apertures in the grooves 40 are positioned in a predetermined spaced relation to the outer ends of the grooves to provide an imperforate surface in the end portion of each groove for receiving a cap therein.

The outer portion of the disk 20 is reduced in thickness to form an annular recess 57 in the underneath portion thereof to provide clearance for a nozzle 60 (Fig. 2) which is mounted on the plate 26 beneath the outer portion of the disk 20. The nozzle 60 has a hollow stem 62 extending therefrom to which one end of a hose 63 from a supply of compressed air is attached and has a set of three ports or apertures 65 which are aligned with the apertures 58 in successive radial rows of apertures as the disk 20 rotates.

In the operation of the device a scoop full of caps 12 may be deposited in the lower portion of the hopper and as the disk 20 rotates it will agitate the caps and cause some of them to be deposited in the groove 40 in their lower positions and others to adhere to the upper surface of the disk and be carried along therewith in a clockwise direction as viewed in Fig. 1. As the caps which overlie the apertures 58 reach a position in alignment with the nozzle 60 they will be dislodged from the surface of the disk 20 by streams of air issuing from the ports 65 of the nozzle and will fall back into the pile of caps at the bottom of the hopper. The caps positioned in the outer portion of the grooves 40 are carried upwardly beyond the nozzle 60 by the disk 20 and the side walls of the grooves and when the grooves advance to their upper positions near the upper portion of the device, gravity will cause the caps 12 to slide down the grooves 40 and be deflected upwardly by the inclined ends surfaces 44 over and onto the ends of the pins 42 aligned therewith. Some of the caps 12 which are carried upwardly by the disk 20 will be positioned in the grooves 40 with their flanges 18 extending upwardly while others will be positioned therein with their flanges directed downwardly. The caps 12 having their flanges directed upwardly as they are carried toward the top of the hopper and slide down the groove 40 onto the pins 42 will not be retained on the pin and will continue their movement downwardly onto the pile of caps at the bottom of the hopper whereas those which are positioned with their flanges extending downwardly in the grooves 40 will, as they slide downwardly along the grooves 40 and onto the pins 42, be retained on the pins 42 by the engagement of the flanges 18 therewith. As the disk 20 continues its rotation the caps 12 on the pins 42 will be carried into engagement with the fingers 49 and cammed thereby off of the pins and will slide downwardly on the fingers 49 and the wall 48 into engagement with the wall portion 55 of the chute and will then roll into the chute 14 and be guided therethrough in a predetermined oriented edge-to-edge relation relative to each other.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for orienting cup-shaped caps comprising a disk mounted for rotation about an oblique axis, a wall encircling said disk and cooperating therewith to form a hopper for receiving caps therein, means for rotating said disk, radial grooves in said disk extending inwardly from the periphery thereof for receiving caps therein and moving said caps upwardly with the disk and causing them to slide down said grooves, pins in said disk adjacent the ends of said grooves, said grooves and pins being arranged relative to each other to cause a cap sliding down a groove to be directed over and onto the end of said pin and to be retained thereon if the cap is positioned with its side walls directed downwardly, and means for removing the caps from said pins and guiding them for movement in a predetermined path.

2. In a device for aligning cup-shaped caps in a predetermined relation to each other, the combination of a member having a substantially flat upper face thereon mounted for turning movement about an oblique axis perpendicular to said face, means cooperating with said member to receive and position a supply of said caps against said face, said member having a groove in the face thereof directed toward said axis for receiving a cap therein for sliding movement therealong, means for imparting turning movement to said member to move said groove from a lower position in engagement with said supply of caps for receiving a cap therein to an upper position for causing the cap to slide down said groove, a pin on said member adjacent the end of said groove, said groove and pin being arranged relative to each other to cause a cap sliding down said groove to be directed over and onto the end of said pin and retained thereon if the cap is positioned with its side walls directed downwardly, and means for removing the cap from said pin and guiding it for movement in a predetermined path.

3. A device for orienting cup-shaped caps comprising a disk mounted for rotation about an oblique axis, said disk having a plurality of grooves therein spaced from and directed toward said axis, a member cooperating with said disk to form a receptacle for receiving and positioning a supply of said caps against a portion of said disk, means for rotating said disk to move said grooves from a lower position in engagement with said supply of caps for receiving said caps therein to an upper position for causing the caps to slide down said grooves, pins on said disk adjacent the ends of said grooves, said grooves and pins being arranged relative to each other to cause a cap sliding down a groove to be directed over and onto the end of a pin and retained thereon if the cap is positioned with its side walls directed downwardly, and cam means mounted adjacent the path of travel of said pins for removing the caps therefrom.

4. A device for assorting cup-shaped caps comprising a disk mounted for rotation about an oblique axis, a wall encircling a portion of said disk and cooperating therewith to form a receptacle for holding a supply of said caps in engagement with a portion of said disk, means for rotating said disk, radial grooves in said disk in spaced relation to said axis for receiving caps therein when said grooves are in a lower position and moving said caps upwardly with the disk and causing them to slide down said grooves, pins in said disk adjacent the ends of said grooves, said grooves having sloping cam surfaces at the inner ends thereof to cause the caps sliding down the grooves to be directed over and onto the ends of said pin and retained thereon if the caps are positioned with their side walls directed downwardly, and cam means mounted adjacent the path of travel of said pins for removing the caps from said pins.

5. A device of the type described comprising a disk mounted for rotation about an oblique axis, said disk having a plurality of grooves therein spaced from and directed toward said axis, a member cooperating with said disk to form a receptacle for receiving and positioning a supply of said caps against a portion of said disk, means for rotating said disk to move said grooves from a lower position in engagement with said supply of caps for receiving said caps therein to an upper position for causing the caps to slide down said grooves, pins on said disk adjacent the ends of said grooves, said grooves having sloping inner end surfaces for directing the caps sliding down the grooves over and onto the ends of said pins and retained thereon if the caps are positioned with their side walls directed downwardly, a chute for receiving said caps in edge-to-edge relation, and means including an element mounted adjacent the path of travel of said pins for camming the caps from said pins and guiding the caps into said chute.

6. A device for orienting cup-shaped caps comprising a disk mounted for rotation about an oblique axis, said disk having a plurality of grooves therein spaced from and directed toward said axis, a member cooperating with said disk to form a receptacle for receiving and positioning a supply of said caps against a portion of said disk, means for rotating said disk to move said grooves from a lower position in engagement with said supply of caps for receiving said caps therein to an upper position for causing the caps to slide down said grooves, pins on said disk adjacent the ends of said grooves, said grooves and pins being arranged relative to each other to cause a cap sliding down a groove to be directed over and onto the end of said pin and retained thereon if the cap is positioned with its side walls directed downwardly, means for dislodging said caps from successive portions of said disk except one cap in each of said slots as successive portions of said disk are moved upwardly from the supply of caps, and cam means mounted adjacent the path of travel of said pins for removing the caps therefrom.

7. A device for orienting cup-shaped caps comprising a foraminous disk mounted for rotation about an oblique axis, said disk having a plurality of grooves therein spaced from and directed toward said axis for receiving caps therein, said grooves having imperforate portions for supporting caps thereon, a member cooperating with said disk to form a receptacle for receiving and positioning a supply of said caps against said disk, means for rotating said disk to move said grooves from a lower position in engagement with said supply of caps for receiving said caps therein to an upper position for causing the caps to slide down said grooves, pins on said disk adjacent the ends of said grooves, a nozzle connectible to a supply of compressed air and positioned below said disk for directing air at a predetermined point through successive portions of said disk as said disk is rotated to dislodge the caps except the caps on said imperforate portions of said grooves from successive portions of said disk, said grooves and pins being arranged relative to each other to cause a cap sliding down a groove to be directed over and onto the end of said pin and retained thereon if the cap is positioned with its side walls directed downwardly, and means for removing the caps therefrom from said pins.

8. A device of the type described comprising a disk mounted for rotation about an oblique axis, said disk having a plurality of grooves therein spaced from and directed toward said axis, a member cooperating with said disk to form a receptacle for receiving and positioning a supply of said caps against a portion of said disk, means for rotating said disk to move said grooves from a lower position in engagement with said supply of caps for receiving said caps therein to an upper position for causing the caps to slide down said grooves, pins on said disk adjacent the ends of said grooves, said grooves having sloping inner end surfaces for directing the caps sliding down the grooves over and onto the ends of said pins whereby said caps are retained thereon if the caps are positioned with their side walls directed downwardly, a chute for receiving said caps in edge-to-edge relation, means including an element mounted adjacent the path of travel of said pins for camming the caps from said pins and guiding the caps into said chute, said disk having a plurality of perforations therethrough disposed between and in predetermined areas in said grooves through which air may be directed to dislodge the caps adhering to the surface of said disk except the caps in the end portions of said grooves, and a stationary nozzle connectible to a source of compressed air and disposed under said disk at a position relative to the travel of said grooves intermediate the upper and lower positions thereof for directing air through successive portions of the disk as it rotates to remove the caps except those in the end portions of said grooves from successive portions of said disks.

CECIL C. McCAIN.

REFERENCES CITED

The following references are of record in the file of this patent:

UNITED STATES PATENTS

| Number | Name | Date |
| --- | --- | --- |
| 887,298 | Wilmore | May 12, 1908 |